June 13, 1939.  H. KREFFT ET AL  2,161,824
GASEOUS ELECTRIC DISCHARGE DEVICE
Filed Feb. 24, 1937
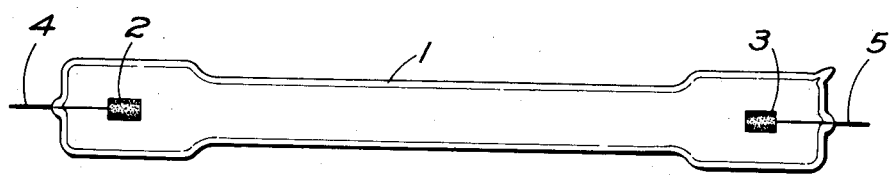
Inventors:
Hermann Krefft,
Walter Hanlein,
Martin Wagner,
BY *Harry E. Dunham*
ATTORNEY Patented June 13, 1939

2,161,824

UNITED STATES PATENT OFFICE 2,161,824

GASEOUS ELECTRIC DISCHARGE DEVICE

Hermann Krefft, Berlin-Friedrichshagen, Walter Hänlein, Berlin-Spandau, and Martin Wagner, Weisswasser O/L, Germany, assignors to General Electric Company, a corporation of New York Application February 24, 1937, Serial No. 127,500
In Germany March 5, 1936

4 Claims. (Cl. 176—122)

The present invention relates to gaseous electric discharge devices generally and more particularly the invention relates to such devices having a gaseous atmosphere therein consisting of or comprising an alkali metal vapor and a container consisting of a boro-silicate glass resistant to the hot ionized, alkali vapor.

In the development of the art of vitreous materials resistant to hot, ionized alkali metal vapor it was believed, at first, that any composition containing silica could not successfully resist such vapor. In accordance with this belief many borate glass compositions were developed which were resistant to such vapor. These borate glasses are extremely difficult to fabricate into lamp containers even when the glass contains appreciable amounts of alkaline earth because of their tendency to bubble and foam when being worked in a flame. Later it was discovered that boro-silicate glasses containing substantial amounts of silica and having other constituents in suitable proportions were resistant to hot ionized alkali metal vapors. These boro-silicate glasses have a working range which is long enough to permit the fabrication of the glass into containers for alkali vapor electric discharge devices and do not bubble nor foam when being worked in a flame.

We have observed that while these boro-silicate glasses are resistant to the hot, ionized alkali metal vapor in the sense that they do not become brown or lose their high transmissivity for the radiations from the discharge in the discharge device they nevertheless are affected by the hot, ionized metal vapor when a high current input is used. Usually the current input on alkali vapor discharge lamps is sufficient to maintain the container temperature at about 240° C. during the operation of the device. When the current input is increased to raise the container temperature to about 300° C. undesirable changes in the light output and the electrical characteristics of the discharge lamp device take place. The object of the invention is to provide vapor resistant boro-silicate glasses useful as container glasses for vapor electric discharge devices. Still further objects and advantages attaching to the device and to its use and operation will be apparent to those skilled in the art from the following particular description. We have discovered that such changes in the light output and electrical characteristics of the device are minimized when the boro-silicate container glass contains no alkali. This unexpected result is inexplicable at present though we have demonstrated that the absence of alkali from the boro-silicate container glass is critical in avoiding undesirable changes in the light output and electrical characteristics of alkali vapor discharge lamps when the current input is sufficient to raise the temperature of the lamp container to about 300° C., or higher.

Accordingly we have developed metal vapor resistant, boro-silicate glasses which contain no alkali and which are useful as container glasses for gaseous electric discharge lamp devices generally and particularly for those devices having a gaseous atmosphere consisting of or comprising alkali metal vapor. The glasses of the present invention make possible the successful operation of such devices at higher container temperatures and with greater current inputs than has been found practical with similar devices having containers consisting of alkali containing glasses. The glasses of the present invention are particularly useful as container glasses for discharge devices having a gaseous atmosphere consisting of or comprising sodium vapor, potassium vapor, magnesium vapor, mercury vapor, or a mixture of potassium vapor and mercury vapor.

A good glass is one having the following composition in percentages by weight:

|  | Per cent |
|---|---|
| Silica ($SiO_2$) | 15 to 25 |
| Alumina ($Al_2O_3$) | 25 to 35 |
| Boric oxide ($B_2O_3$) | 20 to 35 | and a quantity of calcium oxide. When desired the calcium oxide is replaced in whole or in part by barium oxide. Care should be exercised in the manufacture of the glass to keep it as free as possible from deleterious impurities, such as iron oxide. Glasses having the following compositions in percentages by weight are particulary good:

|  | 1 | 2 |
|---|---|---|
|  | Per cent | Per cent |
| Silica ($SiO_2$) | 20 | 20 |
| Alumina ($Al_2O_3$) | 30 | 30 |
| Boric oxide ($B_2O_3$) | 30 | 25 |
| Calcium oxide (CaO) | 20 | 15 |
| Barium oxide (BaO) |  | 10 |

These new boro-silicate, hard glasses have a softening temperature higher than 600° C. and are not deleteriously affected by the metal vapor filling of the device even when the current input is such that the container temperature is greater than 300° C. The glasses of the invention are capable of being worked in a flame without harmful devitrification. A particular advantage of the new glasses is their low coefficient of expansion. The two specific glass compositions disclosed above and embodying the invention have coefficients of expansions of about $$\alpha 500 = 49 \times 10^{-7}$$

or about $\alpha 500 = 47 \times 10^{-7}$, respectively; hence it is possible to seal molybdenum current leads directly to the container consisting of such glasses without interposing special sealing glasses therebetween.

In the drawing accompanying and forming part of this specification a gaseous electric discharge lamp device having a container made of the glass of the present invention is shown in a front elevational view.

The gaseous electric discharge lamp device comprises a container 1 having thermionic electrodes 2 and 3 mounted on leads 4 and 5, respectively, sealed into the ends of said container 1. Electrodes 2 and 3 consist of a sintered mixture of pulverized particles of high melting point metal, such as tungsten, and electron emitting material, such as barium oxide, and are heated to an electron emitting temperature by the voltage drop thereat and the passage of the discharge current therethrough. Said container 1 has a starting gas therein, such as argon, neon, or xenon, or a mixture of such gases, and a quantity of vaporizable material, such as sodium, the vapor of which is light emitting during the operation of the device.

Said container 1 consists of a boro-silicate glass containing no alkali as disclosed above and the current leads 4 and 5 consist of molybdenum which is fused directly to the boro-silicate container glass. The gaseous electric discharge lamp device is preferably mounted in a light transmitting, heat retaining means, such as a vitreous, evacuated, sealed envelope, or a vitreous, double-walled vessel having the space between the walls thereof evacuated and sealed. The heat retaining means has been omitted from the drawing for purposes of simplicity of illustration.

The gaseous electric discharge lamp device described above and having a container made of the glass of the invention is a long lived, efficient lamp which has stable operating characteristics at current loads of such magnitude that similar devices having containers made of boro-silicate glasses containing alkali have unstable operating characteristics.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, other types of thermionic electrodes are used, when desired, and, when desired, the container of the device consists of flashed glass the inner layer of which consists of the glasses of the invention.

What we claim as new and desire to secure by Letters Patent of the United States, is:

1. A gaseous electric discharge device comprising a container, electrodes sealed therein, a gaseous atmosphere and a quantity of vaporizable alkali metal therein, the inner surface of said container being of an alkali vapor resistant glass having the following composition:

|  | Per cent |
|---|---|
| Silica ($SiO_2$) | 15 to 25 |
| Alumina ($Al_2O_3$) | 25 to 35 |
| Boric oxide ($B_2O_3$) | 20 to 35 |
| Alkaline earth oxide | 20 to 25 |

2. A gaseous electric discharge device comprising a container, electrodes sealed therein, a gaseous atmosphere and a quantity of vaporizable alkali metal therein, the inner surface of said container being of an alkali vapor resistant glass having the following composition:

|  | Per cent |
|---|---|
| Silica ($SiO_2$) | 20 |
| Alumina ($Al_2O_3$) | 30 |
| Boric oxide ($B_2O_3$) | 30 |
| Calcium oxide (CaO) | 20 |

3. A gaseous electric discharge device comprising a container, electrodes sealed therein, a gaseous atmosphere and a quantity of vaporizable alkali metal therein, the inner surface of said container being of an alkali vapor resistant glass having the following composition:

|  | Per cent |
|---|---|
| Silica ($SiO_2$) | 20 |
| Alumina ($Al_2O_3$) | 30 |
| Boric oxide ($B_2O_3$) | 25 |
| Calcium oxide (CaO) | 15 |
| Barium oxide (BaO) | 10 |

4. A gaseous electric discharge device comprising a container, electrodes and electrode leads sealed therein, a gaseous atmosphere and a quantity of vaporizable alkali metal therein, said leads consisting of molybdenum and being fused directly to said container, said container being of an alkali vapor resistant glass having the following composition:

|  | Per cent |
|---|---|
| Silica ($SiO_2$) | 15 to 25 |
| Alumina ($Al_2O_3$) | 25 to 35 |
| Boric oxide ($B_2O_3$) | 20 to 35 |
| Alkaline earth oxide | 20 to 25 |

HERMANN KREFFT.
WALTER HÄNLEIN.
MARTIN WAGNER.